United States Patent [19]

Saroka et al.

[11] Patent Number: 4,581,702
[45] Date of Patent: Apr. 8, 1986

[54] CRITICAL SYSTEM PROTECTION

[75] Inventors: Stephen F. Saroka; Glenn C. Smith, both of Wappingers Falls, N.Y.

[73] Assignee: International Business Machines Corporation, Armonk, N.Y.

[21] Appl. No.: 456,882

[22] Filed: Jan. 10, 1983

[51] Int. Cl.[4] .................. G06F 12/08; G06F 12/10; G06F 12/00
[52] U.S. Cl. .................................................. 364/200
[58] Field of Search .............................. 364/200, 900

[56] References Cited

U.S. PATENT DOCUMENTS

| | | | |
|---|---|---|---|
| 3,947,823 | 3/1976 | Padegs et al. | 364/200 |
| 4,096,573 | 6/1978 | Heller et al. | 364/200 |
| 4,136,385 | 1/1979 | Gannon et al. | 364/200 |
| 4,177,510 | 12/1979 | Appell et al. | 364/200 |
| 4,355,355 | 10/1982 | Butwell et al. | 364/200 |
| 4,373,179 | 2/1983 | Katsumata | 364/200 |
| 4,376,297 | 3/1983 | Anderson et al. | 364/200 |

Primary Examiner—Raulfe B. Zache
Assistant Examiner—William G. Niessen
Attorney, Agent, or Firm—Bernard M. Goldman

[57] ABSTRACT

This disclosure improves data processing system integrity by assigning content types to virtual pages and using the assigned content types to enforce special access rules. The page content types are: (a) any changeable data and/or any executable instructions (current S/370); (b) SCP executable instructions and/or unchangeable data (SENC); (c) SCP restrictively changeable data only (system DO); and optionally (d) application data only (user DO). Page content type designation is done by providing in each PTE two integrity control flag bits called herein SENC and DO. In the first embodiment, the SENC and DO bits are separately coded to respectively control access to SENC and system DO page types. In a second embodiment the SENC and DO bits are combinatorially encoded to obtain four types. A new system integrity state, the SCP state, is provided to protect SENC and system DO page usage. The SCP state is initiated by a hardware interrupt, i.e. a swap of PSWs, and exists only as long as the CPU is fetching instructions from SENC pages. The following new program interrupts are provided to identify when the CPU tries: (1) to execute an instruction fetched from a SENC page while the system is not in the SCP (2) to execute an instruction fetched from a system or application DO page; or (3) to store data into a system DO page using an instruction not fetched from a SENC page. Also while in the SCP state, key zero users are forced to change their access key, whenever necessary, to match the storage key of any page frame prior to changing it.

28 Claims, 6 Drawing Figures (UNAUTHORIZED KEY ZERO USE INHIBIT)

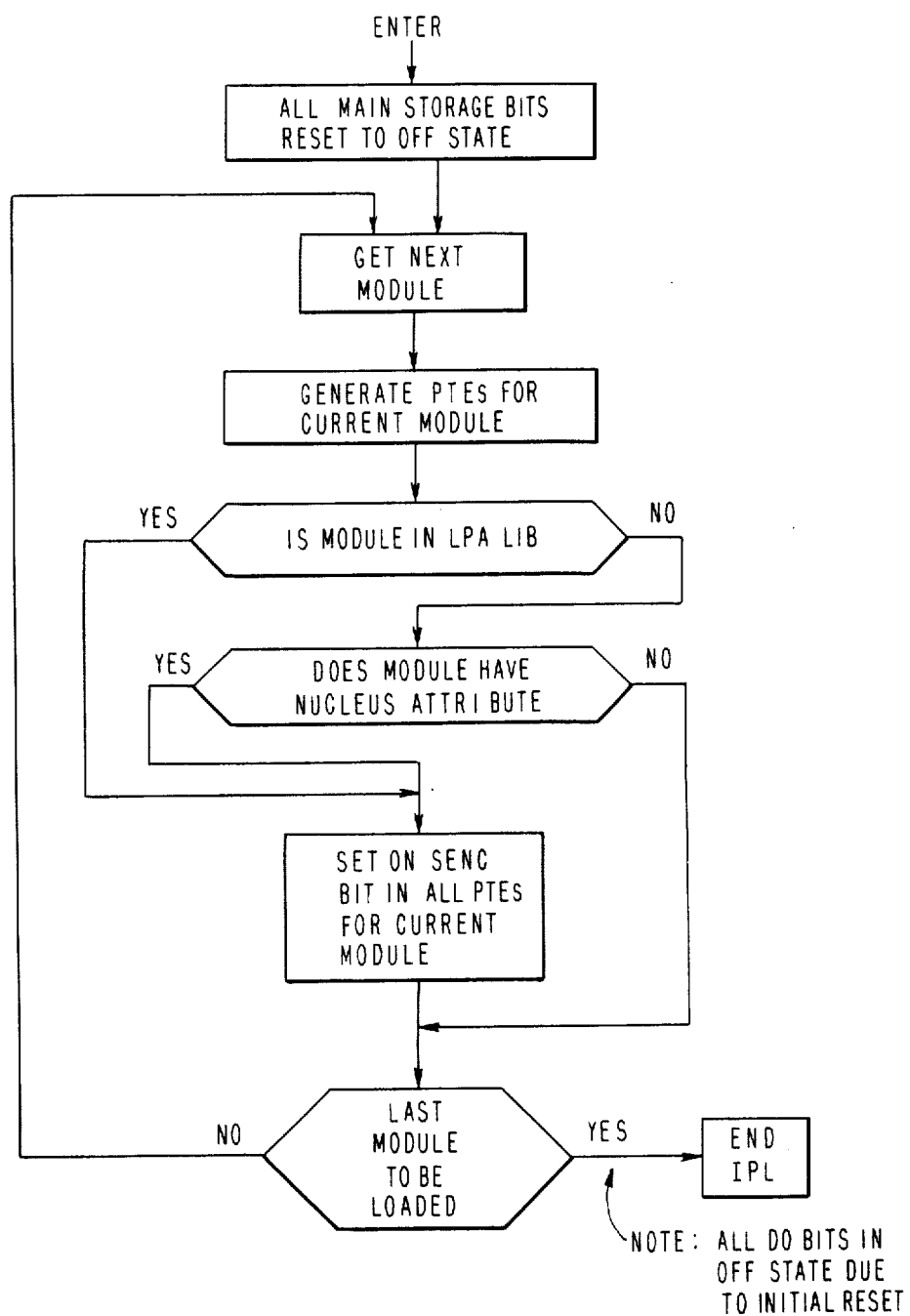
FIG. 6 (RESOURCE INITIALIZATION PROGRAM)

CRITICAL SYSTEM PROTECTION

This invention relates to maintaining the integrity of the content of virtual storage in a data processing system. The invention specifically relates to the prevention of the destruction of the contents of critical portions of system storage that may result in unrecoverable outages of a data processing system. Both uni-processor (UP) and multi-processor (MP) systems may use the subject invention.

PRIOR ART

Current operating systems continue to be vulnerable to problems that can lead to unscheduled system outages, such as:

1. Unauthorized user access to system control program (SCP) areas in main storage can incapacitate an operating system. This is usually the result of either a deliberate or unintentional branch into a SCP routine area without invoking an interface established by programming convention (i.e. agreement among all system users to abide by a predefined set of rules for accessing SCP program routines and SCP data areas).

2. Modifications of SCP data areas (such as control blocks essential to the overall operation of an operating system) can be done by unauthorized users.

3. Application programs erroneously accessing their data areas for instructions which execute as wild stores into SCP data areas.

Current means used in the IBM System/370 integrity control include:

1. CPU problem-state: a CPU executing in problem-state cannot execute special SCP instructions which require the privileged state.

2. Storage protection keys: key-controlled protection is only available to blocks in real storage, e.g. to real storage page frames. Key protection cannot be assigned to virtual storage per se. That is, as long as a page in virtual storage is not in System/370 real main storage (such as when the page is only in system auxiliary storage or on I/O) no protect key can be assigned to that page. It is only when the page is being assigned a page frame in main storage upon the occurrence of a page fault and dynamic address translation (in preparation for transferring the page from an I/O device or auxiliary storage into real storage) that a protect key is assigned to that page which previously existed only in virtual storage. Any key from zero to fifteen can be assigned to the page frame. A key is also assigned to the program accessing real storage, and the program access key is put into the current program status word (PSW) in System/370 systems. Normally, an equal comparison is required between the program access key and the storage key assigned to a page frame being accessed before access is permitted to store into the page frame. However, key zero is treated differently from the non-zero keys in System/370, and no compare equal is required for it so that a key-zero store or fetch request is permitted at any requested real address, regardless of the storage key value assigned to the real address. Nevertheless, a non-zero access key in the current PSW must match the storage key assigned to the requested real address before a store request is permitted to occur. A fetch request for a non-zero access key is normally permitted access even when its keys do not compare equal, unless its fetch-protection bit is on in which case the access is permitted only if the access key matches the storage key. Thus, if the fetch-protection bit is off, a fetch request is allowed, regardless of any key match.

3. Low storage protection: this facility provides protection against the destruction of information in the real address range of 0 through 511 bytes during CPU interruption processing using a zero key. Low storage protect is enabled by bit position 3 in control register 0. This is described and claimed in U.S. Pat. No. 4,093,987.

4. Authorized Program Facility (APF): This is a pure software authorization control which allows an IBM MVS/370 installation to restrict its use of SVC routines to authorized programs. An APF authorized program is one that executes in supervisor state with a PSW (Program Status Word) access key of 0-7, or the JSCB (Job Step Control Block) indicates APF authorization. The SVC first-level interrupt handler ensures that only authorized programs can access sensitive SVC routines that are marked APF protected in a special table, SVCTABLE. APF also prevents authorized programs from accessing any load module that does not come from an authorized library. An APFTABLE (Authorized Program Facility Table) is initialized by the MVS/370 operating system with APF authorized data set names and volume serial numbers.

There have been numerous attempts in the past to improve the integrity of system storage which are found in the prior art including those discussed previously in this specification. These techniques include a variety of protection controls which apply directly to real main storage such as: low storage protect, storage protect keys for protecting the contents of the blocks in real main storage in which each storage key has a RO (read-only) flag bit. Additional real storage flag bits are described in U.S. Pat. No. 3,377,624 to R. A. Nelson et al which provides a control memory containing the storage protect keys for main storage, in which each key contains special flag bits for protecting the content of an associated real storage block, such as: S1 for conditional write protection, S2 for a privileged program which can store into a S1 block, S3 for code which cannot be transferred into except by a transfer privileged block, and S4 for code which is transfer privileged.

It has also been proposed to provide tag bits in real storage with each word or group of words therein for controlling the type of access permitted thereto, i.e. program, operand, etc.

Other main storage content protection art includes: U.S. Pat. No. 3,263,218 which provides instructions to control a zone of addresses which cannot be stored into; U.S. Pat. No. 3,264,615 which used high-order address bits that are common to an assigned area of main storage to be protected from unauthorized accesses: U.S. Pat. No. 3,271,744 which describes a real memory fencing control; U.S. Pat. No. 3,328,765 which describes and claims storage protect key arrays of the type used in the IBM/360 System; and U.S. Pat. No. 3,328,768 which describes and claims the Program Status Word access key operation used in the IBM/360 System.

Virtual storage protection is different from real storage protection. Virtual storage includes the address space concept in which different address spaces are used for isolating the different virtual storages of different users. In regard to virtual storage content protection, segment read-only protection has been proposed by providing a segment read-only (RO) flag bit position in each segment table entry of a system to protect against segment modification, which is described in the IBM System/370 Principles of Operations, Form No. GA22-7000-8, 9th Edition (October 1981).

Other prior techniques for virtual storage protection are provided in U.S. Pat. No. 4,228,496 and in an article entitled "Virtual Memory Management in the VAS/VMS" by H. M. Levy and P. H. Lipman published in the March 1982 edition of "Computer" by the IEEE Computer Society. This technique uses the two high-order bits of each virtual address to designate which of four regions within an address space is to be accessed. These regions are predetermined for system code, system data, user data, and user code in a manner that does not allow flexibility for controlling the size of each of the four regions. Lack of flexibility for subsequently changing the size of the regions may cause great inefficiency in using virtual storage by causing large gaps of virtual space to be unused.

Also in the prior art is the MULTICS rings of protection scheme which defines a circular hierarchy of protection for areas of storage which contain data or programs using special registers in the CPU for addressing the respective areas of storage.

All of the above prior art is significantly different from the subject invention.

SUMMARY OF THE INVENTION

Objects of the invention are to:

1. Prevent application programs from changing pages containing SCP routines. This is usually caused by either a deliberate or unintentional branch into a page containing a SCP routine without invoking the virtual address interface to SCP program areas established by programming conventions.

2. Prevent unauthorized changes in SCP data pages such as to pages containing SCP control blocks.

3. Prevent attempts to execute system data or application data (mistaken for instructions). This is most prevalent as an instruction fetch due to an address error causing either a wild branch or drop-through into a data area. (An example of this would be a hex string of X'D2D5C9E5C5E2' being interpreted as a MVC X'9E5' (213, R12), X'5E2' (R12), but it could be an entry in a buffer having an EBCDIC value of KNIVES.) There's no way for a S/370 processor today to make that distinction.

4. Force all SCP routines to have a protect key match (even when using key zero) before the SCP is allowed to alter any page frame (PF). This prevents a SCP routine with key zero from altering any PF having a non-zero storage key due to an improper operation like a wild store or a wild branch caused by violating virtual address interface conventions.

5. Prevent any SCP routine using any access key (including key zero) from changing any page frame without a key match, while allowing non-SCP programs (e.g. application programs) to use key zero to access routines and data without a key match in order to maintain downward compatibility for old S/370 application programs; but preventing any non-SCP routine using key zero from accessing any PF having a page marked as containing SCP instructions or SCP data only, regardless of whether a key match is obtained.

Features of this invention are:

1. System control program authorization state (called "SCP state"). When in SCP state, SCP virtual program routines using key zero in real storage cannot change pages assigned non-zero storage keys without first getting and using a matching non-zero access key.

2. A new flag signal called "data only" (DO) in each PTE (Page Table Entry) for enabling the content of any page to be defined as containing only data and no executable instructions. When the DO flag signal is set on, it signifies to the processor that no instruction fetch is permitted within this page.

3. A new PTE flag signal called "SCP executable and non-changeable" (SENC) for enabling the content of any page to be defined as containing SCP instructions which can be fetched from the associated page while the processor is in SCP state and cannot be changed with virtual addressed instructions, even though any virtual addressed instruction (whether SCP or not) may be allowed to fetch operand data from that page under control of the fetch protect bit in the protect key.

4. Hardware enforced detection and prevention of application program routines from modifying any page marked in its PTE as SCP data only (DO).

5. Hardware detection and prevention of any attempt to execute instructions in any page marked in its PTE as system DO (which cannot contain executable machine instructions).

6. Hardware detection and prevention of any attempt to execute instructions in any page indicated in its PTE to be a user DO page.

7. Indicating most or all of the above page contents by either a separate coding or a coded combination of the settings of plural flag bits in each PTE.

8. Controlling the termination of the SCP state in both an instruction pipelined CPU and in a non-pipelined CPU.

9. Using instruction and operand buffers in a pipelined processor to synchronize the page content flag controls to bridge the timing difference in a pipelined processor between the time of a determination of page content type in processor's storage controls and the later execution of instructions and their operands in the processor's execution unit.

This invention provides a processor (e.g. CPU) with a method for improving system integrity by assigning and detecting different content types for virtual pages. The page content types are: (a) any changeable data and/or any executable instructions; (b) SCP executable instructions and/or unchangeable data; (c) SCP restrictively changeable data only; and optionally (d) application data only. Page content type designation is done by providing two integrity control flag bits in each PTE, called herein the SENC and DO flag bits. SENC represents "SCP executable and not changeable" and, DO represents "data only".

In the first embodiment, the SENC and DO bits are separately coded to respectively control a SENC page type and a system DO page type. When both SENC and DO bits are off, the page content is handled as a current S/370 page and can contain any changeable data and/or executable routines without any restrictions. In the first embodiment, the SENC and DO bits are not allowed to both be on.

In a second embodiment the SENC and DO bits are combinatorially encoded, as follows: (1) with both bits off, the page is defined as in S/370 to contain any changeable data and/or executable routines without restrictions; (2) with the SENC bit on and DO bit off, the page is defined as containing SCP executable instructions and/or unchangeable data; (3) with the SENC bit off and DO bit on, the page is defined as containing application data only and no executable machine instructions; and (4) with both SENC and DO bits on, the page is defined as containing SCP data only and no executable machine instructions.

In order to prevent non-SCP programs (e.g. application programs) from accessing pages defined to contain SCP programs or SCP data, this invention provides a new level of system integrity control called the SCP state. The SCP state is initiated by a hardware interrupt, i.e. a swap of PSWs (program status words), e.g. machine check interrupt, external interrupt, program interrupt, input/output interrupt, and interrupting instructions (e.g. supervisor call, program call, program transfer, etc.). The SCP state can exist only as long as the CPU is fetching instructions from SENC pages. While the SCP state is active, any attempt to execute an instruction fetched from a non-SENC page results in resetting the SCP state environment. The SCP state can only be reestablished via a hardware interrupt. This ensures that an uncompromising hardware interface exists between routines in SENC and in non-SENC pages without any dependency on user agreements (i.e. conventions).

While in the SCP state, key zero users accessing real storage page frames assigned to SENC virtual pages are prohibited from modifying any other page frames having non-zero keys (e.g. one through fifteen). This ensures data integrity by forcing key zero users to change their access key to a non-zero storage key of the other page frame to be accessed prior to altering it (or prior to fetching it if the other PF's storage fetch protect bit is on), so that if a wild branch should occur from the other PF, the changed key user cannot destroy any page frame protected by any other storage key, as would happen for a current S/370 key zero user.

The invention provides new program interrupt codes to identify attempts to violate these integrity protection features. These new program interrupts are:

XX—The CPU tries to execute an instruction fetched from a SENC page while the system is not in the SCP state.

YY—The CPU attempts to execute an instruction fetched from a system DO page.

ZZ—The CPU tries to store data into a system DO page when the CPU is not in SCP state.

In the second embodiment, interrupt YY can be split into two interrupts, as follows:

YY1—The CPU attempts to execute an instruction fetched from a system DO page.

YY2—The CPU attempts to execute an instruction fetched from a user DO page.

The invention may be used in both non-pipelined and pipelined CPUs, however its implementation in pipelined CPUs is more complex. The complexity in pipelining CPUs is due to the fact that a CPU's SCP state should not be ended until execution of an instruction fetched from a SENC page which is after the prefetching of that instruction. That is, SENC or non-SENC page types may be detected while instructions are being prefetched in a pipelined CPU, but the termination of the SCP state, the generation of the invention's new interrupt conditions and operand store inhibit signal should not be done until execution of an integrity violating instruction.

BRIEF DESCRIPTION OF THE DRAWINGS

FIG. 6 is a flow diagram of an initializing program for setting on the SENC page flags in the page tables.

DETAILED DESCRIPTION OF THE EMBODIMENTS

Figure 1:
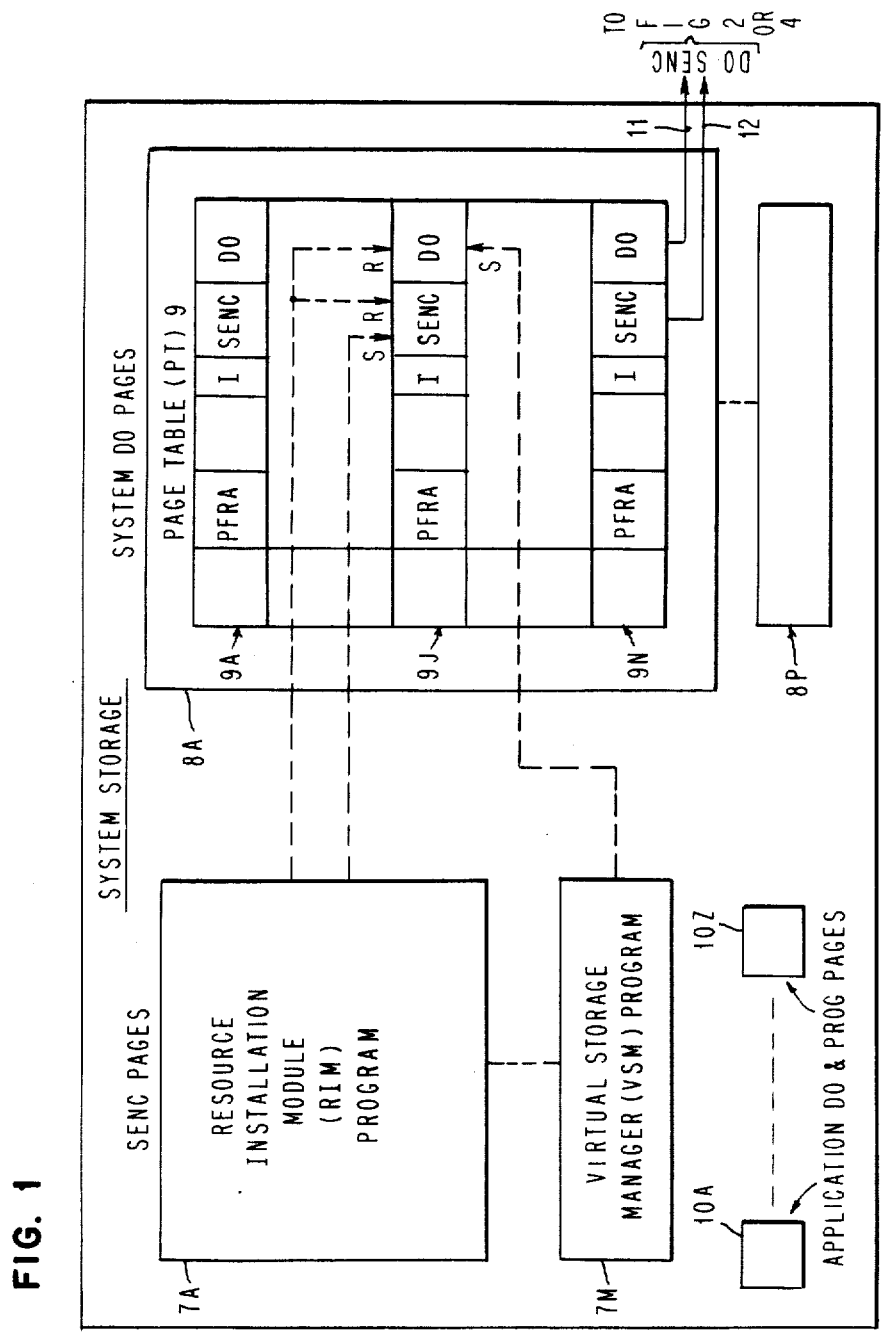
FIG. 1 is a system storage map showing some of the various types of pages in system storage, and page tables with entries modified by the subject invention.

FIG. 1 illustrates system storage, which includes the virtual storage of the system mapped into page tables. The content of some of the pages may be found in the 4KB page frames in real main storage or in 4KB slots in auxiliary storage which may be on I/O devices. A plurality of SENC (SCP executable non-changeable) pages 7A through 7M contain SCP routines such as the resource initialization module (RIM) program in page frames 7A etc., and the virtual storage manager (VSM) program in page frames 7M etc.

System data only (DO) pages are represented in FIG. 1 by page frames 8A through 8P. Page frames 8A are illustrated to contain a page table 9 which contains page table entries (PTEs) 9A through 9N. Each PTE contains a plurality of fields including: page frame real address (PFRA), invalid (I) bit, SENC bit, and DO bit.

Figure 5:
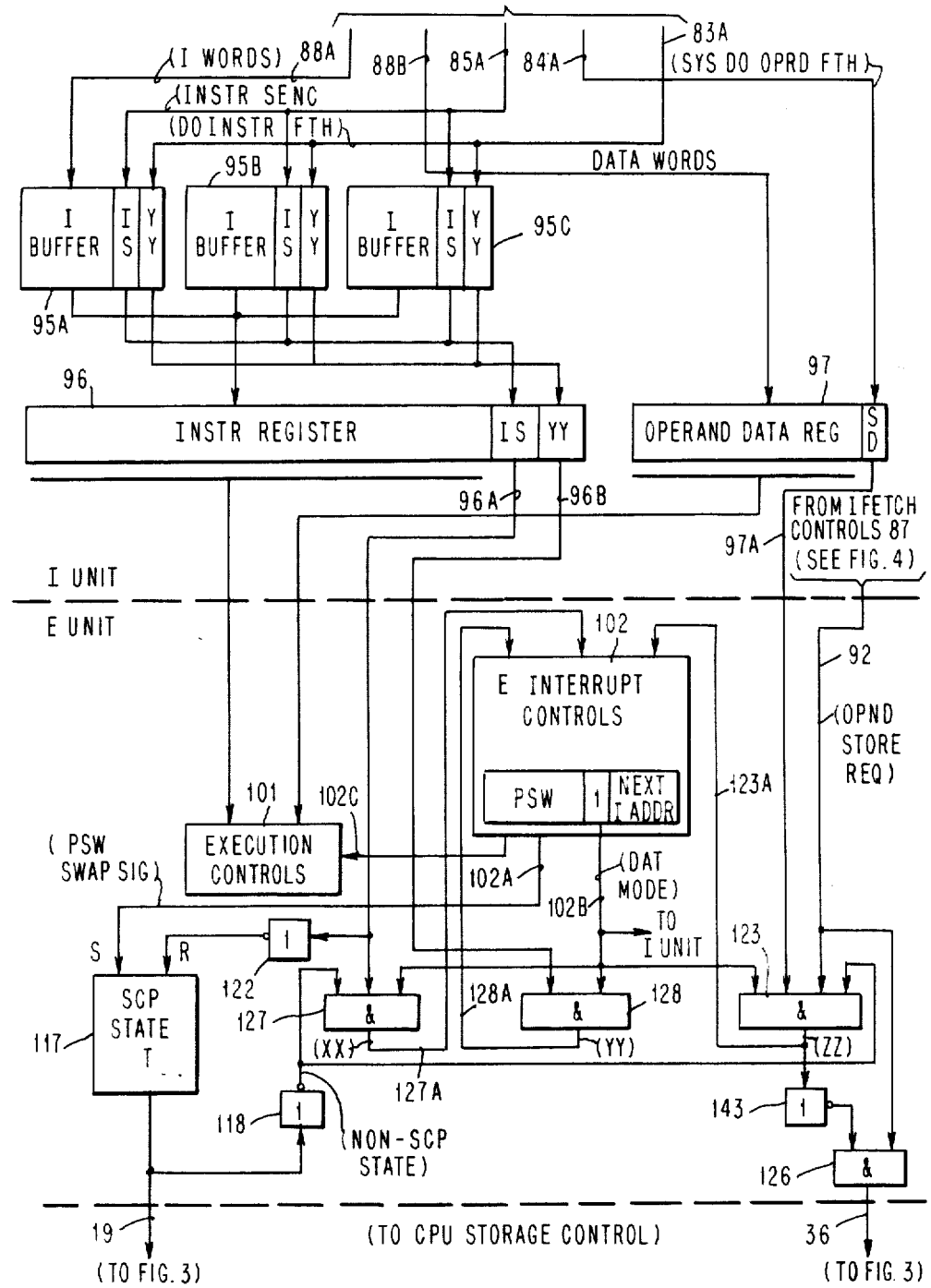

The RIM program is used to generate and initialize all PTE fields in all page tables being initialized. This includes the operations of setting the PFRA fields to blank values and setting all I bits on. The RIM program also loads the content of the SENC pages into assigned page frames (PFs) in main storage. Also, the RIM program initializes the SENC bits in all page tables to on or off states according to values prespecified in tables provided to the RIM program that determine the content type for the prespecified SENC pages. The RIM program resets to off state all of the DO bits in the page table. FIG. 5 is a self-explanatory flow diagram of the operation of the RIM program on the SENC and DO bit settings.

The virtual storage manager (VSM) program is executed by the CPU after user program(s), and dispatched to allocate page frames (PFs) when demanded by CPU requested virtual address misses in main storage, as each page address is translated by: finding its PTE, e.g. 9N, assigning a page frame real address (PFRA) which is entered into the PFRA field in the PTE, and the I bit is set off to indicate that entry is now valid. VSM checks predetermined page content assignment tables for the address of the current virtual page and sets on the DO bit in the PTE if the page being translated is indicated in the tables to be a DO page.

For the first embodiment, VSM sets on the DO bit only for a system DO page.

For the second embodiment herein, VSM sets on the DO bit for either a system DO page or a user DO page, and for a system DO page also sets on the SENC bit.

Figure 2:
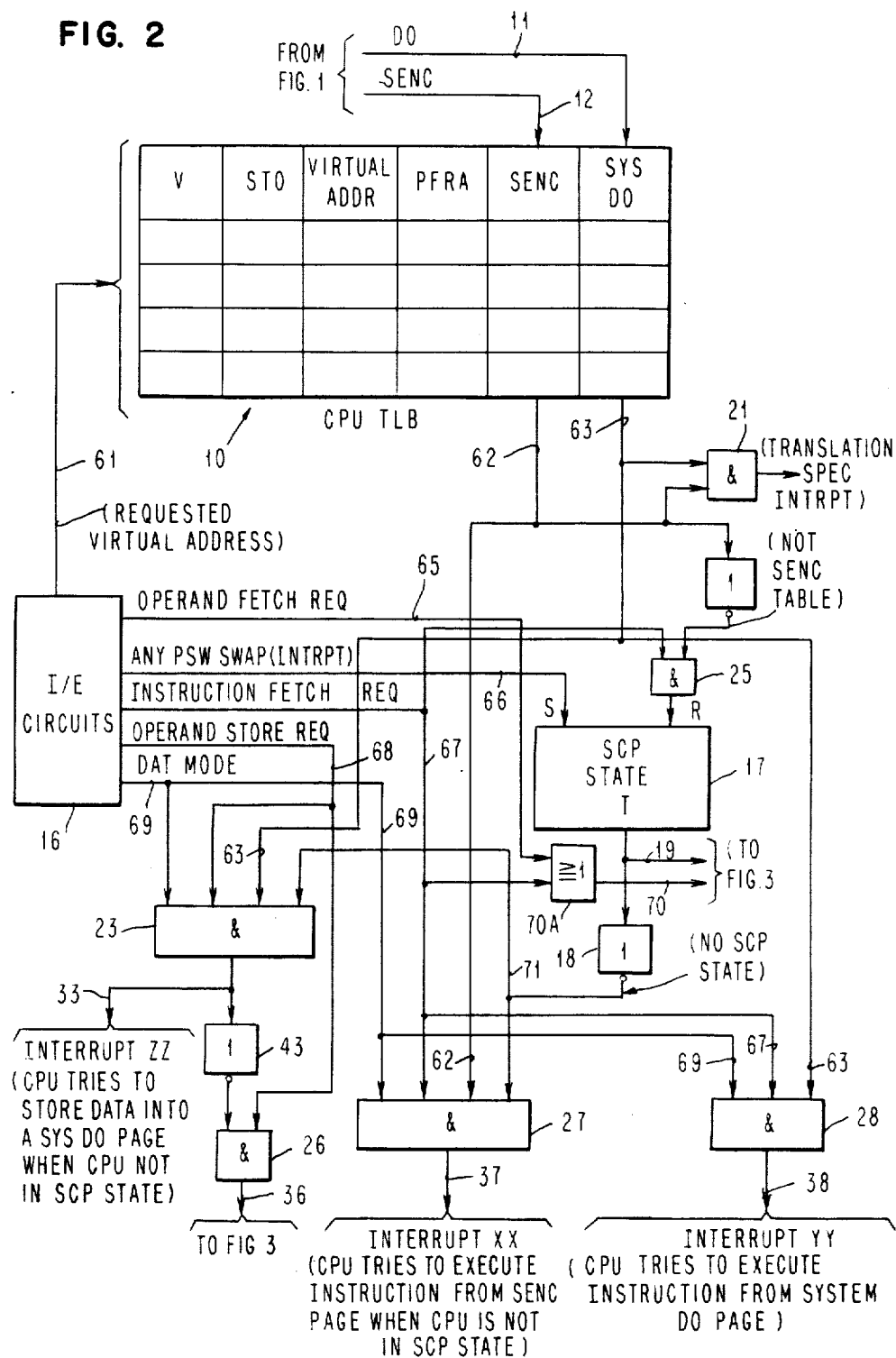
FIG. 2 illustrates a hardware embodiment of the invention for a non-pipelined processor.

FIG. 2 illustrates the first embodiment in which the SENC and system DO bit states in page table 9 in FIG. 1 are interpreted in accordance with the following first embodiment truth table:

1st Embodiment Truth Table

| SCP STATE | SENC | SYS DO | PAGE CONTENT | KEY 0 MATCH FOR ACCESS |
|---|---|---|---|---|
| 1. NO | 0 | 0 | Application code, and/or data. Changeable by appl. or SCP. | NO |
| 2. YES | 0 | 1 | SCP data only. (Changeable only by Instr. from SENC page.) | YES |
| 3. YES | 1 | 0 | Executable SCP code, and/or SCP data. Unchangeable. (Called SENC page.) | NO |
| 4. — | 1 | 1 | Not allowed. | — |

Whenever a particular PTE in a page table of the respective user is selected by the user's currently requested virtual address in the conventional manner, the values of the SENC and system DO bits in the PTE are provided to lines 11 and 12 in the CPU storage control unit or buffer control element (according to the particular hardware design of the CPU) and are set into a selected entry in the CPU's TLB (translation lookaside buffer), which is sometimes called a DLAT (directory lookaside address translator).

The manner of address translation and the basic operation of the TLB is conventional (in the manner done in current commercial CPUs such as the IBM 3033 or 3081 data processing systems). Likewise, the manner of selection of an entry in the TLB is also conventionally done by the virtual address being requested on a bus 61 from instruction/execution (I/E) circuits 16 in the CPU. Each TLB entry has the fields: valid (V) bit, STO (segment table origin), virtual address, page frame real address (PFRA), SENC bit, and system DO bit.

In the conventional manner, the TLB is searched for each CPU requested virtual address; and if it is not found in the TLB, a TLB is thereby detected and a TLB entry is selected into which the virtual address is inserted into its virtual address field, the PFRA is copied into the selected TLB entry from the PFRA field in the selected PTE (e.g. 9N in FIG. 1), and the V bit is set on to indicate the TLB entry is valid.

The SENC and system DO fields are also set by signals on lines 12 and 11 respectively into the selected TLB entry after being obtained from the selected PTE in FIG. 1.

When a virtual address request by the I/E circuits 16 on line 61 to the TLB 10 finds a valid entry in the TLB (i.e. TLB hit), the SENC and system DO bit states are read out of the selected entry on line 62 and 63. An AND circuit 21 detects the not allowed combination in the first embodiment of both the SENC and system DO bits having 1 values and thereupon provides an output on line 31 signalling a translation specification interruption.

An SCP state trigger 17 is provided which is set on whenever any PSW swap (i.e. interrupt) signal is provided on a line 66 from I/E circuits 16. The SCP state must be on before the SCP can be executed by the CPU. Also, the SCP state requires that the SCP have a protect key match before it can change the content of any page frame in real storage even though the SCP is using access key 0. In the IBM S/370 architecture, only key 0 never required a match for enabling access to real storage, even though every non-zero access key (1-15) required a match with the PF storage protect key before access was allowed to that PF.

The SCP state exists as long as the CPU consistently fetches instructions from SENC pages. As soon as the CPU attempts to execute an instruction from a non-SENC page (i.e. the TLB entry for an instruction accessed page has its SENC bit off), an off signal is then provided on line 62 to an inverter 22 which then outputs a signal to an AND gate 25 that also receives an instruction fetch request signal provided from the I/E circuits 16 to generate a signal to the reset input of the SCP state trigger 17, which resets it to non-SCP state.

The embodiment in FIG. 2 is useable in non-pipelined processors which fetch and complete the execution of one instruction at a time (including fetching all operands) before beginning the execution of the next instruction, the reset of the SCP state trigger 17 can be simply controlled by AND gate 25 in FIG. 2 providing a reset output signal to trigger 17 whenever it is enabled by signals on instruction fetch request line 67 and a non-SENC page signal from inverter 22. That is, the output of AND gate 25 will detect each instruction to be accessed from a non-SENC page; and when the CPU is in SCP state, it will detect the first non-SENC instruction which must end the SCP state.

To summarize, the SCP state for the CPU has the following effects, which are:

1. Enables the CPU to fetch instructions from SENC pages;
2. Forces all changes in any system DO page to only be done by SCP instructions fetched from SENC pages.
3. Forces the SCP to use protect key matches before it can store into any PF in main storage, including requiring a match for access key 0.

These three conditions are enforced by circuits in FIG. 2.

FIG. 2 generates four virtual page protective signals by means of AND gates 23, 26, 27 and 28.

AND gate 27 operates to force the CPU to be in SCP state when it fetches SCP instructions from SENC pages. Its inputs are the no SCP state signal on line 71, the SENC signal on line 62, the instruction fetch signal on line 67, and the DAT (dynamic address translation) mode signal on line 69 which assures that the current instruction address is a virtual address (rather than a real address). An output signal on line 37 from gate 27 provides an interrupt XX signal which causes a program PSW swap and places a unique interrupt code XX into the program interrupt code location to identify the cause of this type of interrupt.

AND gate 23 operates to force the CPU to only allow SCP instructions fetched during SCP state from SENC pages to change system DO pages. Its inputs are the no SCP state signal on line 71, the system DO signal on line 63, the operand store request signal on line 68, and the DAT mode signal on line 69. An output signal on line 33 provides an interrupt ZZ signal which causes a program interrupt PSW swap (to invoke the program interrupt handler program). The interrupt ZZ signal generates a unique interrupt code ZZ which is placed into the program interrupt code location resulting from the interrupt to identify the cause of the interrupt.

AND gate 28 operates to force the CPU to only fetch data from system DO pages by preventing any instruction fetch from any system DO page. The CPU may be in either SCP or non-SCP state to fetch data in a system DO page. Its inputs are any system DO signal on line 63, an instruction fetch request signal on line 67, and a DAT mode signal on line 69. AND gate 28 provides an output signal on line 38 which provides an interrupt YY signal that generates an interrupt code YY which indicates when the CPU is trying to fetch an instruction from a system DO page.

An AND gate 26 receives each operand store request signal on line 68, and also receives an output from an inverter 43 which is provided as long as no output signal is being provided from AND gate 23.

Figure 3:
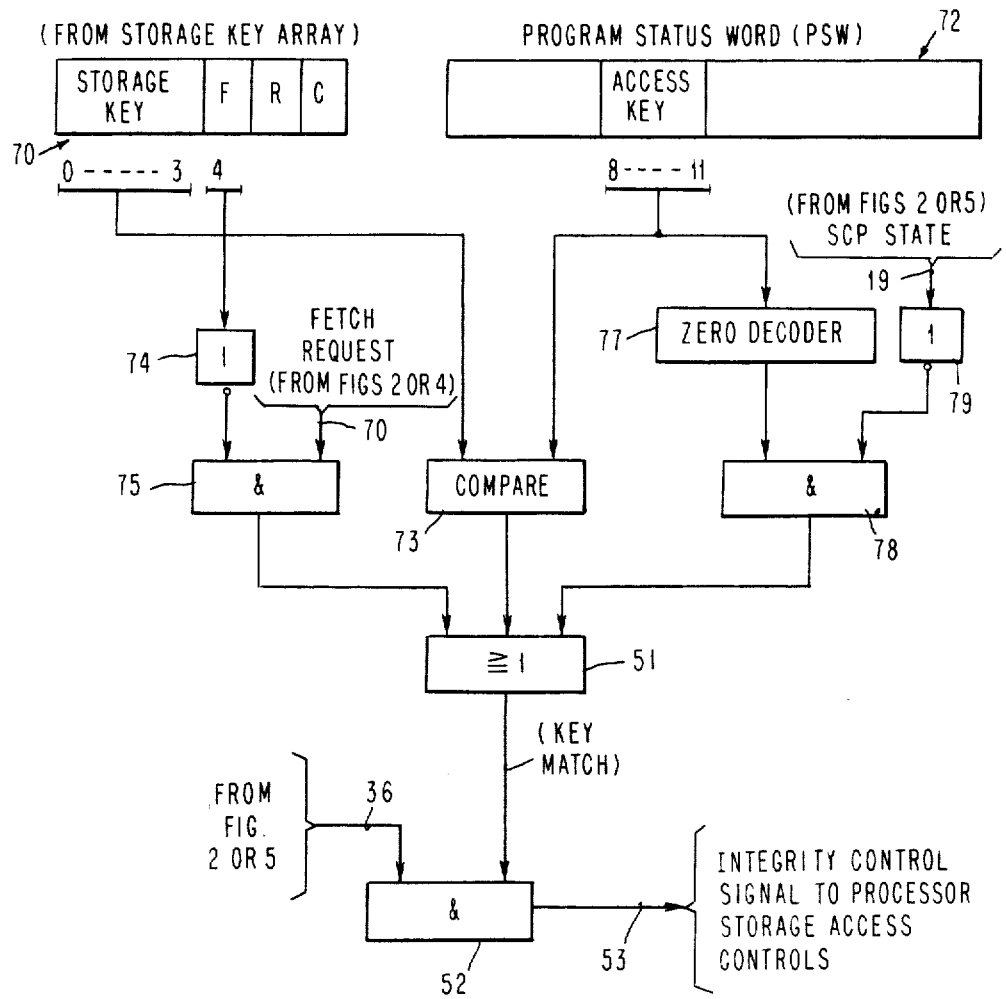
FIG. 3 illustrates circuits for controlling key zero user operations in accordance with the subject invention.

Output line 36 from an AND gate 26 provides a conditioning signal to FIG. 3 to control the disablement of a storage request, that causes interrupt signal ZZ from gate 23 that also suppresses execution of the instruction which issued the store request. Normally, gate 23 should not provide any output signal, and therefore inverter 43 provides a normally enabling output to gate 26. Whenever gate 23 is activated, its inverter signal goes off to deactivate gate 26 and thereby drop the enabling signal on line 36 to FIG. 3, which inhibits the storage access for the current request, which is violating the virtual page integrity rules presented by this invention.

Figure 4:
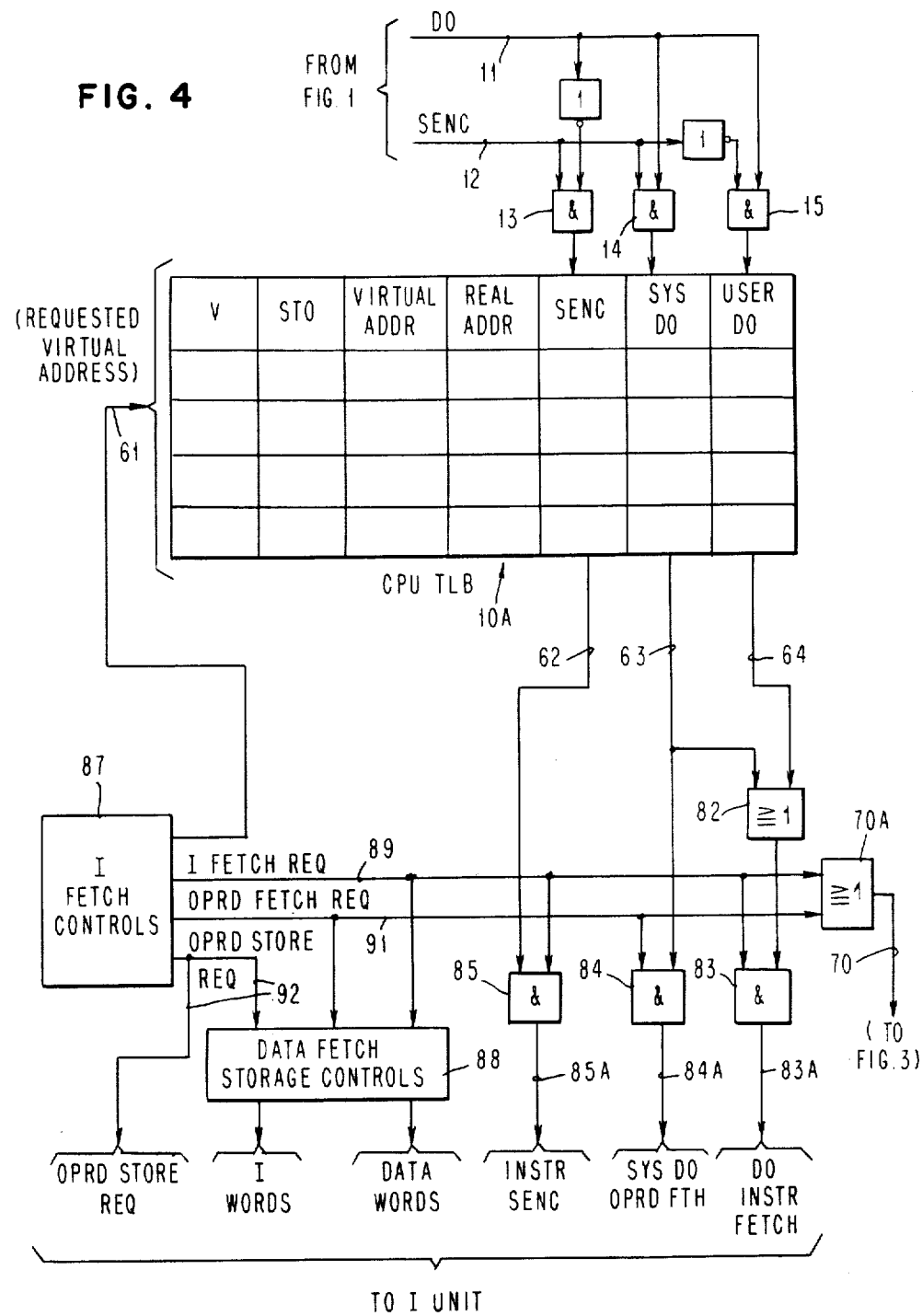
FIGS. 4 and 5 illustrates a second hardware embodiment of the invention for a pipelined processor.

FIG. 3 provides special protect key storage access enablement controls and combines them with the virtual page protection controls in FIG. 2 or 4 to provide an integrity control signal on line 53 from an AND gate 52. The signal on line 53 is provided to the processor storage access control to condition the enabling of the storage requests, which may be of course subject to other conditions of the conventional type which are not part of this invention. No integrity signal from gate 52 inhibits operation of the storage access controls.

Gate 52 also receives an input from the output of an OR circuit 51, which provides an output that is determined by the storage protect key controls. They include an AND gate 75 (which is conventional) to control when a storage fetch request (on line 70 from OR circuit 70A in FIGS. 2 or 4) is inhibited by the on state of a fetch protect bit F with the storage key when there is no key match indicated by the output of a compare circuit 73. When the fetch protect bit F is set off, inverter 74 will provide an enabling signal to AND gate 75, so that there will then be an enabling signal from OR circuit 51.

The storage key in register 70 (obtained from a storage key array) is compared with the access key in the PSW 72 by compare circuit 73, which provides an output only if its two inputs compare equally in the conventional manner.

AND gate 78 and its connections control how the access key with value 0 controls storage accesses with this invention. One input of gate 78 receives an output from a zero decoder 77 whenever it detects a zero value from the access key in the current PSW. The other input of gate 78 receives the output of an inverter 79 which receives the SCP state signal on line 19 from FIG. 2 or 5. Whenever the SCP state exists for the CPU, AND gate 78 is disabled, which is during SCP execution. As a result, the SCP access key in PSW 72 must compare equal with the page frame storage protect key 70 in AND gate 73 in order to enable AND gate 52 before the currently requested storage access can be enabled by the integrity control output signal from gate 52.

However, if the CPU is not in the SCP state, the output of inverter 79 conditions AND gate 78. Then if a non-SCP program (e.g. application program) is executing with an access key of zero, AND gate 78 is enabled by the output of decoder 77 to provide an output through OR circuit 51 (that bypasses compare circuit 73) to condition AND gate 52 which then provides an integrity control signal for the request.

FIG. 4 illustrates the second embodiment of this invention which is basically similar to the first embodiment in FIG. 2 but instead uses the second embodiment truth table, as follows:

| SCP STATE | SENC | SYS DO | PAGE CONTENT | KEY 0 MATCH FOR ACCESS |
|---|---|---|---|---|
| 1. NO | 0 | 0 | Application code, and/or data. Changeable by appl/SCP. (S/370 page) | NO |
| 2. NO | 0 | 1 | Application data data only & changeable by appl/SCP & no executable code. (User DO page) | NO |
| 3. YES | 1 | 0 | Executable SCP code, and/or SCP data & Unchangeable. (SENC page.) | YES |
| 4. YES | 1 | 1 | SCP data only, no executable code & changeable only by instr. from SENC page. (System DO page.) | YES |

2nd Embodiment Truth Table

This embodiment requires a permutation of the coding of the SENC and DO bits and allows both bits to be on in a PTE, which represents a system DO. Neither a system DO page or a user DO page can contain any executable code. They differ in how they can be changed. A system DO page can only be changed by an SCP routine fetched during SCP state from a SENC page. A user DO page can be changed by any routine (SCP or application) having a protect key match, and by application routines using key zero without a key match.

The second embodiment uses the same page table field format used by the first embodiment (shown in FIG. 1), except the rules in the second embodiment truth table are followed in the settings of the SENC and DO bits. However, the TLB is different in the second embodiment and has an additional field in each entry entitled user DO (data only). The SENC and DO bit permutations for the second embodiment require decoding circuits 13, 14 and 15 for decoding the DO and SENC signals received on lines 11 and 12 from the selected PTE, in order to set the SENC, system DO, or user DO page field in any selected entry in the CPU TLB 10A in FIG. 4. Thus, a gate 13 senses an active signal on line 12 and an inactive signal on line 13 to set the SENC page bit in a selected TLB entry, gate 14 senses when both lines 11 and 12 are active to set the system DO page bit in the selected TLB entry, and gate 15 senses when line 11 is active and line 12 is inactive for setting the user DO page bit in the selected TLB entry.

In FIG. 4, an AND gate 83 is connected to the output of an OR circuit 82 which receives the user DO and the system DO outputs on lines 64 and 63 from the selected TLB entry. The other input of AND gate 83 receive the instruction fetch request on line 89 from I-fetch controls 87. The output 83A of AND gate 83 will provide a DO instruction fetch signal whenever a system DO page or a user DO page is violated by an instruction fetch attempt.

Instead of combining the system and user DO violations into a single DO instruction fetch signal as shown in FIG. 4, it may be split into two signals (system DO instruction fetch and user DO instruction fetch) by instead of gate 83 providing separate AND gates and separate YY1 and YY2 flag bits in the I buffers and instruction register in FIG. 5 (not shown), in order to generate more precise interrupt codes in the PSW to indicate whether an interrupt is caused by either a system DO page violation attempt or a user DO page violation attempt.

An AND gate 84 detects when an operand is being accessed in a system DO page. Gate 84 has inputs which receive the state of a selected TLB system DO bit output on line 63, and any operand fetch request on line 91 from the I-fetch controls 87. Gate 84 provides a system DO operand fetch signal on its output line 84 to indicate when an operand fetch is requested from a system DO page.

An AND gate 85 senses when an instruction fetch request is to a SENC page. Gate 85 receives the SENC bit state in the currently selected TLB entry on line 62 and receives an I-fetch request signal on line 89 from I-fetch control 87. Gate 85 provides an instruction SENC signal on its output line 85A.

The I-fetch request, operand fetch request and operand store request signals on lines 89, 91 and 92 from I-fetch controls 87 are also provided to data fetch storage controls 88 which fetches data and instructions by conventional means from main storage and sends the instruction words on bus 88A and the data words on bus 88B to the I-unit.

In FIG. 5, the I-unit receives the output signals on lines 83A, 84A, 85A, 88A, 88B and 92 from FIG. 4. The I-unit contains three separate I-buffers 95A, 95B and 95C (of the type found in the IBM 3033 CPU). However, each of the I-buffers has a pair of new flag bits IS and YY appended to each instruction buffer location. Flag bit IS (instruction SENC) is set by the instruction SENC signal on line 85A, and flag bit YY is set by the Do instruction fetch signal on line 83A for a conventionally selected instruction location in one of the I-buffers selected at any given time for an I-fetch operation.

The transfer of each instruction from a selected I-buffer 95A, 95B, or 95C into an instruction register 96 is done in the conventional manner that it is done in the current IBM 3033 CPU, except that the novel IS and YY flag bits are also transferred with the instruction into flag bit positions IS and YY in register 96 at the same time.

When operand data for the instruction being executed in register 96 is fetched by data fetch storage controls 88 in FIG. 4, each of the operand(s) of the instruction is transferred on bus 88B to a conventionally selected one of plural operand data registers 97 in FIG. 5. At the time of each operand transfer into a selected register 97, the system DO operand fetch signal on line 84A is also transferred into the respective SD flag bit position in register 97 associated with the corresponding register 97. (Only one of plural registers 97 is shown in FIG. 5 to enable a clearer understanding of this invention.)

In FIG. 5, the components 117, 118, 122, 123, 126, 127, 128 and 143 are similar in their operations to the respective components in FIG. 2 having reference numbers 17, 18, 22, 23, 26, 27, 28 and 43.

The SCP state trigger 117 is set on by an interrupt signal on line 102A from the E-unit interrupt controls 102. When on, an SCP state signal is outputted on line 19. When off, a non-SCP state signal is outputted from inverter 118.

Trigger 117 is reset off by the output of inverter 122 when it receives a not IS signal on line 96A from register 96. The not IS signal occurs when the IS flag bit position in register 96 is set off for an instruction provided to register 96 from an instruction buffer. Hence, the SCP state ends as soon as any buffered instruction having an IS bit in off state is transferred into register 96 for execution.

AND gate 123 detects a ZZ interrupt when the current instruction being executed in register 96 has an operand in register 97 with its SD flag bit on when a store is occurring in the operand that was detected from a system DO page during the non-SCP state. The SD bit state is transmitted on line 97A to an input of gate 123, which is also receiving a DAT mode signal on line 102B from the current PSW, an operand store request signal on line 92, and a non-SCP state signal from inverter 118 to control a ZZ interrupt signal on line 123A to the E-unit interrupt controls 102 to cause the occurrence of a CPU interrupt.

AND gate 127 detects a XX interrupt signal when the current instruction in register 96 is fetched from a SENC page while the CPU is not in SCP state. Thus, gate 127 receives the non-SCP state output from inverter 118, the IS flag state on line 96A, and the DAT mode signal on line 102B to control the XX interrupt signal on line 127A to interrupt controls 102 to cause a CPU interrupt.

AND gate 128 detects a YY interrupt signal when the CPU tries to execute any instruction fetched from either a system DO page or a user DO page. Thus, gate 128 receives the YY flag bit state on line 96B, and the DAT mode signal on line 102B to control a YY interrupt signal on line 128A to interrupt controls 102.

AND gate 126 outputs a store request integrity signal on line 36 for each operand store request signal on line 92 as long as inverter 143 does not receive any ZZ interrupt signal from gate 123.

The E-unit execution controls 101 operate in the conventional manner to execute the instructions and operands provided to it from registers 96 and 97, although a signal on bus 102C from interrupt controls 102 will cause the execution controls to suppress the execution of an interrupted instruction.

Accordingly, the correlation of the IS and YY flags with the instructions passing to instruction register 96 handles the delay between the detection of page control types for fetch requests in the storage control unit and the execution of integrity violating conditions in the E-unit.

To summarize the operation of the embodiments, a storage protect key is assigned during S/370 address translation to a real storage page frame (PF) when it is assigned to a virtual page address. In a system operating such as the IBM MVS SCP, each program is initially assigned a particular key value, e.g. zero to the SCP, 1-7 to subsystems and 8-15 to application users. The user's key value is assigned as a storage key to each PF that the user is given when he gets page faults upon requesting access to particular virtual pages. The PF key assignment is not put into the PTEs, and hence the protect keys are not recognized as part of the virtual address space defined by the STs (segment tables) and PTs (page tables). In the IBM MVS operating system, the same key (i.e. the user's key) is assigned to all PFs in main storage receiving virtual pages in the private area of the user's address space, and key zero is assigned to the PFs in the common areas of all address spaces for use by the SCP which the user should not directly access.

SCP routines in SENC pages are permitted to write into system DO and user DO page frames, providing the SCP routine access key (i.e. its PSW key) is an exact match to the system or user DO PF storage key. Non-SENC page routines (e.g. application programs) can not write in system DO PFs but may read data from system DO PFs that do not have their fetch protect bit (F) set on, due to operation by AND gate 75. Any attempt by a non-SENC page instruction to write into a system DO PF will result in a program interrupt, terminating execution by the routine. However, non-SENC page routines operating with key zero continue to have the same privileges as exist in current systems using IBM S/370 architecture when accessing application data and program PFs.

Non-SENC page routines cannot access SENC routines. Non-SENC routines must use an SVC instruction to operate through a hardware interrupt to establish the SCP state and have a SCP routine access the SENC page instructions. This ensures that an uncompromising interface exists between non-SENC and SENC routines. Thus, the SCP state is reset whenever any request is made to a non-SENC page (for which the corresponding PTE has its SENC bit set off).

The SCP state trigger is set on by any PSW swap (i.e. interrupt) in the CPU and the SCP state will exist only as long as every instruction executed by the CPU was fetched from page frames in real main storage assigned to a SENC page.

For example, the page tables in a system will be in system DO pages, so that the states of the SENC and DO bits in the page tables can only be changed by SCP programs fetched from SENC pages while the CPU is in SCP state.

The SENC bits are set on during the initial program loading (IPL) of the SCP by the resource initialization module (RIM) program that constructs skeleton page tables for each segment table entry in each segment table currently being handled and operates according to the steps in the flow diagram in FIG. 5.

As each module is being read from a disk into main store by RIM, it tests whether the module is being read from a special SCP LPA (link pack area) or nucleus library, or whether the module has a special attribute indicating that it is to have SENC protection. If the test is positive, then RIM sets on the SENC bit in every associated PTE containing the module. Then RIM accesses the next module and repeats the operation as it determines whether each page assigned to the next module should have its SENC bit set on in its respective PTE. This process continues until all SENC bits are set either on or off in the IPLed page tables for the system.

The DO bit field is set off in each PTE by a system reset operation prior to the RIM operation.

The DO bit in a page will be set on, or left off, during its virtual storage allocation by the get main routine in the VSM module at the request of the operating system or user in order to protect changeable data which will be put into that page. Only instructions from a SENC page can change the content of a system DO page.

The SCP get main routine in VSM accesses the PTs and tests the state of the I (invalid) flag bits to find a required number of invalid pages to allocate a user get main request. Since SENC pages were preallocated, they are not subject to further allocation by a get main request. The I bits will be set off (indicating validity), and SENC pages will be indicated in both embodiments by a SENC, DO code combination of 10. To set a PTE for a system DO page of the first embodiment, the I bit is set off and the DO bit is set on by the get main module.

For the second embodiment, the get main module sets off the I bit in the PTE and sets on both the SENC and DO bits to indicate a system DO page. For a user DO request, the I bit is set off and only the DO bit is set on by the get main routine.

Thus, SENC page flag bits in the PTEs are set only while the operating system is being IPLed; but DO page flag bits in the PTEs are dynamically set on and off during normal operation by the operating system.

However, it is to be noted that the SENC and/or DO page integrity protection can be applied to any page in any address space, and there is no requirement that they be common among all address spaces, although this can be done where required.

However in pipelined processors, the reset of the SCP state trigger 117 is much more complex as represented in FIGS. 4 and 5 due to the prefetch of instructions from main storage into instruction buffers in advance of the execution of the instructions. That is, if the reset technique of AND gate 25 in FIG. 2 is used in such pipeline processor, the SCP trigger 117 would be reset too early. In other words, trigger 17 would be reset upon an instruction being fetched from a non-SENC page, while one or more SCP instructions in the CPU instruction buffer remain to be executed before the detected non-SENC fetched instruction is reached for execution. This may involve several SCP instructions needing to be executed in SCP state after AND gate 25 detects the first non-SENC fetched instruction during SCP state. Therefore, the SCP state should not end until the first non-SENC fetched instruction is reached for execution, which may be many instructions later in the execution sequence from when the first non-SENC fetched instruction was detected by gate 25.

This pipeline problem is solved in FIG. 5 by marking each instruction as it is put into the CPU instruction (I) buffer with IS and YY flag bits indicating whether (1) it is an instruction which was fetched from a SENC page, or (2) from a system DO or user DO page.

The content of either a SENC page or a DO page can be read by instructions from any other page, except that instructions in a SENC page cannot be fetched for execution by an application program. For these reasons the invention protects the integrity of SCP instructions and data from unauthorized changing, and improper accessing, but does not protect the security of the page contents.

While the invention has been particularly shown and described with reference to plural embodiments thereof, it will be understood by those skilled in the art that various changes in the form and details may be made therein without departing from the spirit and scope of the invention.

Having thus described our invention, what we claim as new and desire to secure by Letters Patent is:

1. A method for improving the integrity of virtual storage for a data processing system having a main storage and at least one CPU for accessing virtual pages in page frames (PFs) in main storage, the CPU capable of operating with dynamic address translation (DAT) for translating the virtual address of a page to a PF real address (PFRA) in main storage using a segment table and a page table (PT) in main storage, a system control program (SCP) in the data processing system for controlling the resources of the system, the method comprising:

setting a DO (data only) page flag in each PT entry (PTE) to a state which designates that an associated virtual page contains non-executable data, translating a program requested virtual address and assigning an entry in a translation lookaside buffer (TLB) in the CPU to receive the address translation, including representations of the virtual address and a PFRA to locate the virtual page in main storage, setting a DO field position in the assigned TLB entry to the state of the DO page flag in the associated PTE, sensing the state of the DO field position in the assigned TLB entry for a requested virtual address of each instruction fetch request by the CPU, preventing the CPU from completing execution of an instruction from a PF having an assigned TLB entry containing a DO field position sensed by the sensing step to have a state indicating a DO page type.

2. A method as defined in claim 1, the preventing step further comprising:

interrupting the CPU execution of a program containing the instruction found by the sensing step to be fetched from a PF having an assigned TLB entry with the DO field position set to a DO page type state.

3. A method for improving the integrity of virtual storage for a data processing system having a main storage and at least one CPU for accessing virtual pages in page frames (PFs) in main storage, the CPU capable of operating with dynamic address translation (DAT) for translating the virtual address of a page to a PF real address (PFRA) in main storage using a segment table and a page table (PT) in main storage, a system control program (SCP) in the data processing system for controlling the resources of the system, the method comprising:

setting a SCP bistable device when the CPU performs a hardware interrupt to designate that the CPU is in a SCP state, setting a SENC (SCP executable non-changeable) page flag in each PT entry (PTE) to a state which designates a SENC page type of content for an associated virtual page, in which the content can only be executed by a SCP program while the CPU is in SCP state and cannot be changed by a store request having a virtual address, translating a program requested virtual address and assigning a translation lookaside buffer (TLB) entry to receive the address translation, including representations of the virtual address and a PFRA to locate the virtual page in main storage, setting a SENC field position in the assigned TLB entry to the state of the SENC page flag in the associated PTE, resetting the SCP bistable device to a non-SCP state when the CPU attempts to execute an instruction which is fetched from a PF associated with a PTE having the SENC page flag set to non-SENC state, enabling the CPU to execute an instruction fetched from a PF having an assigned TLB entry containing a SENC field position set to a state indicating a SENC page type while the CPU is in SCP state.

4. A method as defined in claim 3, further comprising:

sensing the state of the SENC field position in the assigned TLB entry for a requested virtual address of each instruction fetch request by the CPU, prohibiting the CPU from completing execution of an instruction from a PF having an assigned TLB entry containing a SENC field position set to a state indicating a SENC page type when the CPU is not in SCP state, whether or not the instruction is executing with the CPU in privileged state.

5. A method as defined in claim 4, further comprising:

setting a system DO (data only) page flag in a PTE to a state which designates that an associated virtual page contains non-executable SCP data, setting a system DO field position in the assigned TLB entry to the state of the system DO page flag in the associated PTE, sensing the state of the system DO field position in the assigned TLB entry for a requested virtual address of a store operand requested by an instruction being executed by the CPU, disabling a storage access for the requested store operand when the sensing step senses the state of the system DO field position as a system DO page state, while the non-SCP state exists in the CPU, whereby the content of a system DO page type can only be changed by an instruction fetched from a SENC page type.

6. A method as defined in claim 5, further comprising:

setting a pair of flag bit positions in each PTE to a page type code that represents the content of the associated virtual page to be one of: any data and/or program (any type), application (DO) data only, SENC program and/or data (SENC type), or system (DO) data only, whereby the application DO and system DO page types cannot contain any executable instructions.

7. A method as defined in claim 6, further comprising:

initially setting the page type code in selected PTEs to represent SENC page types during an initial program loading of the page tables for the system.

8. A method as defined in claim 7, further comprising:

allocation setting of the system DO and application DO page type codes in the PTEs for associated pages determined to contain a system DO page type or an application DO page type when assigning each PF in main storage during the translating step.

9. A method as defined in claim 4, the prohibiting step further comprising:

interrupting the CPU execution of a program containing the instruction found by the sensing step to be fetched from a PF associated with a TLB entry containing a SENC field position set to a SENC state while the CPU is in a non-SCP state.

10. A method as defined in claim 5, the disabling step further comprising:

interrupting the CPU execution of a program containing the instruction requesting the store operand when the disabling step is activated to prevent a store operation in the associated system DO page frame in main storage.

11. A method as defined in claim 5, further comprising:
setting one of separate SENC and system DO flag bit positions in each PTE to indicate the associated page is either a SENC page type or system DO page type,
providing a system DO field position in each TLB to enable an indication to the CPU of a system DO page type having a content of system data only,
whereby a system DO page type does not contain any executable instructions.

12. A method as defined in claim 6, further comprising:
decoding the combinatorial state of the page type code in each PTE during the translating step to detect the page type for the associated page,
the setting steps controlling the settings of the page type determined by the decoding step into one of respective flag bit positions in the assigned TLB entries to represent the content type in the associated PFs.

13. A method as defined in claim 3 provided in a non-pipelined CPU, further comprising:
selecting a TLB entry with a virtual address requested for an instruction fetch by the CPU,
sensing the SENC field position in the TLB entry selected by the selecting step,
the resetting step resetting the SCP bistable device to a non-SCP state when the sensing step senses the state of the SENC field position indicates a non-SENC page type for an instruction fetch request,
whereby while the CPU is in a SCP state, the first instruction attempted to be executed from a non-SENC page type will reset the CPU to non-SCP state.

14. A method as defined in claim 3 provided in a pipelined CPU, further comprising:
selecting a TLB with a virtual address requested for an instruction fetch by the CPU,
sensing the SENC field position in the TLB entry selected by the selecting step,
generating an instruction SENC signal with a state indicating a SENC or non-SENC page type according to the state sensed by the sensing step,
buffering each instruction SENC signal as an IS flag with each associated fetched instruction in an instruction buffer,
registering for execution an instruction from the instruction buffer with the associated IS flag,
the resetting step resetting the SCP bistable device to non-SCP state after the registering step if the IS flag indicates a non-SENC page type.

15. A method as defined in claim 14 for a pipelined CPU, further comprising:
also setting a DO page flag in each PTE to a state which designates the content of the associated page as being data only page type which cannot contain executable instructions, and setting a DO field position in an assigned TLB entry to an on state for a DO page flag setting in an associated PTE,
selecting a TLB with a virtual address requested for an operand fetch being requested by the instruction being executed in the CPU,
sensing the state of a DO field position in any TLB entry selected by the selecting step for an instruction fetch request,
generating a DO instruction fetch signal when the sensing step senses an on state for the DO field position in the assigned TLB for the instruction fetch request,
buffering each DO instruction fetch signal as a YY flag with each associated fetched instruction in an instruction buffer,
registering for execution an instruction from the instruction buffer with the associated YY flag,
suppressing the execution of the instruction if the YY flag is on after being registered by the registering step,
whereby an instruction fetched from a DO page type is not permitted to complete execution.

16. A method as defined in claim 15, further comprising:
having the DO page flag in each PTE and the DO field position in each TLB entry represent a system data only page type.

17. A method as defined in claim 14 for a pipelined CPU, further comprising:
suppressing the CPU execution of the instruction after the registering step when the IS flag indicates the instruction was fetched from a SENC page type and the CPU is not in SCP state.

18. A method as defined in claim 14 for a pipelined CPU, further comprising:
also setting a system DO page flag in each PTE to a state which designates the content of the associated page as being a system data only page type which cannot contain executable instructions, and setting a system DO field position in an assigned TLB entry to an on state for a system DO page flag setting in an associated PTE,
selecting a TLB with a virtual address requested for an operand fetch being requested by the instruction being executed in the CPU,
sensing the state of a system DO field position in any TLB entry selected by the selecting step for an operand fetch request,
generating a system DO operand fetch signal when the sensing step senses an on state for the system DO field position in the assigned TLB for the operand fetch request,
registering the state of the system DO operand fetch signal as an SD flag with an associated operand fetched from main storage into an operand data register in response to the operand fetch request,
CPU signalling of an operand store request for the instruction being executed for storing data into the operand fetched into the operand data register to change the operand,
inhibiting any storing into main storage of the changed operand in the operand data register if the SD flag is on while the CPU is not in the SCP state,
whereby an operand is not stored into a system DO page when the CPU is not in SCP state.

19. A method as defined in claim 15 for a pipelined CPU, further comprising:
actuating CPU interrupt controls in response to the suppressing step.

20. A method as defined in claim 15, further comprising:
having the DO page flag in each PTE and the DO field position in each TLB entry represent an application data only page type.

21. Means for improving the integrity of virtual storage for a data processing system having a main storage and at least one CPU for accessing virtual pages in page frames (PFs) in main storage, the CPU capable of operating with dynamic address translation (DAT) for translating the virtual address of a page to a PF real address (PFRA) in main storage using a segment table and a page table (PT) in main storage, a system control program (SCP) in the data processing system for controlling the resources of the system, comprising:

means for setting a DO (data only) page flag in each PT entry (PTE) to a state which designates that an associated virtual page contains non-executable data, means for translating a program requested virtual address and means for assigning an entry in a translation lookaside buffer (TLB) in the CPU to receive the address translation, including representations of the virtual address and a PFRA to locate the virtual page in main storage, means for setting a DO field position in the assigned TLB entry to the state of the DO page flag in the associated PTE, means for sensing the state of the DO field position in the assigned TLB entry for a requested virtual address of each instruction fetch request by the CPU, means for preventing the CPU from completing execution of an instruction from a PF having an assigned TLB entry containing a DO field position sensed by the sensing means to have a state indicating a DO page type.

22. A method as defined in claim 21, the preventing step further comprising:

means for interrupting the CPU execution of a program containing the instruction found by the sensing means to be fetched from a PF having an assigned TLB entry with the DO field position set to a DO page type state.

23. Means for improving the integrity of virtual storage for a data processing system having a main storage and at least one CPU for accessing virtual pages in page frames (PFs) in main storage, the CPU capable of operating with dynamic address translation (DAT) for translating the virtual address of a page to a PF real address (PFRA) in main storage using a segment table and a page table (PT) in main storage, a system control program (SCP) in the data processing system for controlling the resources of the system, comprising:

means for setting a SCP bistable device when the CPU performs a hardware interrupt to designate that the CPU is in a SCP state, means for setting a SENC (SCP executable non-changeable) page flag in each PT entry (PTE) to a state which designates a SENC page type of content for an associated virtual page, in which the content can only be executed by a SCP program while the CPU is in SCP state and cannot be changed by a store request having a virtual address, means for translating a program requested virtual address and assigning a translation lookaside buffer (TLB) entry to receive the address translation, including representations of the virtual address and a PFRA to locate the virtual page in main storage, means for setting a SENC field position in the assigned TLB entry to the state of the SENC page flag in the associated PTE, means for resetting the SCP bistable device to a non-SCP state when the CPU attempts to execute an instruction which is fetched from a PF associated with a PTE having the SENC page flag set to non-SENC state, means for enabling the CPU to execute an instruction fetched from a PF having an assigned TLB entry containing a SENC field position set to a state indicating a SENC page type while the CPU is in SCP state.

24. Means for improving system integrity as defined in claim 23, further comprising:

means for sensing the state of the SENC field position in the assigned TLB entry for a requested virtual address of each instruction fetch request by the CPU, means for prohibiting the CPU from completing execution of an instruction from a PF having an assigned TLB entry containing a SENC field position set to a state indicating a SENC page type when the CPU is not in SCP state, whether or not the instruction is executing with the CPU in privileged state.

25. A method as defined in claim 24, further comprising:

means for setting a system DO (data only) page flag in a PTE to a state which designtes that an associated virtual page contains non-executable SCP data, means for setting a system DO field position in the assigned TLB entry to the state of the system DO page flag in the associated PTE, means for sensing the state of the system DO field position in the assigned TLB entry for a requested virtual address of a store operand requested by an instruction being executed by the CPU, means for disabling a storage access for the requested store operand when the sensing means senses the state of the system DO field position as a system DO page state while the non-SCP state exists in the CPU, means for interrupting the CPU execution of a program containing the instruction requesting the storage operand when the disabling means is activated to present a store operation in the associated system DO page frame in main storage, whereby the content of a system DO page type can only be changed by an instruction fetched from a SENC page type.

means for resetting the SCP bistable device to a non-SCP state when the CPU attempts to execute an instruction which is fetched from a PF associated with a PTE having the SENC page flag set to non-SENC state, means for enabling the CPU to execute an instruction fetched from a PF having an assigned TLB entry containing a SENC field position set to a state indicating a SENC page type while the CPU is in SCP state.

26. Means as defined in claim 25, further comprising:

setting one of separate SENC and system DO flag bit positions in each PTE to indicate the associated page is either a SENC page type or system DO page type, means for providing a system DO field position in each TLB to enable an indication to the CPU of a system DO page type having a content of system data only, whereby a system DO page type does not contain any executable instructions.

27. Means for improving system integrity as defined in claim 24, the prohibiting means further comprising:
  means for interrupting the CPU execution of a program containing the instruction found by the sensing means to be fetched from a PF associated with a TLB entry containing a SENC field position set to a SENC state while the CPU is in a non-SCP state.

28. Means as defined in claim 25, further comprising:
  means for setting a pair of flag bit positions in each PTE to a page type code that represents the content of the associated virtual page to be one of: any data and/or program (any type), application (DO) data only, SENC program and/or data (SENC type), or system (DO) data only,
  whereby the application DO and system DO page types cannot contain any executable instructions.

* * * * *